(12) United States Patent
Yang

(10) Patent No.: US 10,194,287 B2
(45) Date of Patent: Jan. 29, 2019

(54) INFORMATION TRANSMITTING DEVICE AND METHOD AND INFORMATION RECEIVING DEVICE AND METHOD

(71) Applicant: Yulong Computer Telecommunication Scientific (Shenzhen) Co., Ltd., Shenzhen, Guangdong (CN)

(72) Inventor: Fan Yang, Guangdong (CN)

(73) Assignee: Yulong Computer Telecommunication Scientific (Shenzhen) Co., Ltd., Shenzhen (CN)

(*) Notice: Subject to any disclaimer, the term of this patent is extended or adjusted under 35 U.S.C. 154(b) by 172 days.

(21) Appl. No.: 15/276,257

(22) Filed: Sep. 26, 2016

(65) Prior Publication Data

US 2017/0026810 A1   Jan. 26, 2017

Related U.S. Application Data

(63) Continuation-in-part of application No. PCT/CN2014/074226, filed on Mar. 27, 2014.

(51) Int. Cl.
*H04W 4/14* (2009.01)
*H04W 12/02* (2009.01)
*H04W 60/04* (2009.01)

(52) U.S. Cl.
CPC ............ *H04W 4/14* (2013.01); *H04W 12/02* (2013.01); *H04W 60/04* (2013.01)

(58) Field of Classification Search
CPC .................................. H04W 4/14; H04W 12/02
See application file for complete search history.

(56) References Cited

U.S. PATENT DOCUMENTS

| 2001/0002846 A1* | 6/2001 | Onishi | G06F 3/0619 |
| | | | 348/231.99 |
| 2011/0213845 A1* | 9/2011 | Logan | G06Q 10/107 |
| | | | 709/206 |

(Continued)

FOREIGN PATENT DOCUMENTS

| CN | 101106742 A | * 1/2008 |
| CN | 102255737 A | 11/2011 |

*Primary Examiner* — Kamran Afshar
*Assistant Examiner* — Farideh Madani
(74) *Attorney, Agent, or Firm* — Young Basile Hanlon & MacFarlane, P.C.

(57) ABSTRACT

Provided in the present disclosure are an information transmitting device, an information receiving device, an information transmitting method, and an information receiving method. The information transmitting device comprises: a selection unit, which selects multiple pieces of target recipient information and a target transmission mode for a to-be-transmitted short message on the basis of a selection command received; a first determination unit, which determines whether or not the target transmission mode for the to-be-transmitted short message is a disappear-after-reading transmission mode; a second determination unit, which determines respectively, when the target transmission mode is the disappear-after-reading transmission mode, whether or not disappear-after-reading is currently supported by an information receiving device; and, a processing unit, which transmits the to-be-transmitted short message in the disappear-after-reading transmission mode when the determination is yes and transmits the to-be-transmitted short message in a direct transmission mode when the determination is no.

18 Claims, 7 Drawing Sheets

(56) References Cited

U.S. PATENT DOCUMENTS

2013/0080964 A1\* 3/2013 Shigeta ............... G06F 3/0488
　　　　　　　　　　　　　　　　　　　　　　715/773
2013/0125063 A1\* 5/2013 Lee .................... G06F 3/04883
　　　　　　　　　　　　　　　　　　　　　　715/854

\* cited by examiner

INFORMATION TRANSMITTING DEVICE AND METHOD AND INFORMATION RECEIVING DEVICE AND METHOD

CROSS-REFERENCE TO RELATED APPLICATION(S)

This application is a continuation in part of international Patent Application PCT No. PCT/CN2014/074226, entitled "INFORMATION TRANSMITTING DEVICE AND METHOD AND INFORMATION RECEIVING DEVICE AND METHOD", filed on Mar. 27, 2014, the content of which is herein incorporated by reference in its entirety.

TECHNICAL FIELD

The present disclosure relates to the technical field of terminals, and specifically to an information transmitting device, an information receiving device, an information transmitting method and an information receiving method.

BACKGROUND

With the wide use of smart phones, people's requirements on the security of and privacy of mobile phones are higher and higher. The privacy of short messages as an important communication mode is being paid close attention to by more and more users.

For example, based on a disappear-after-reading transmission mode for the normal short messages, a disappear-after-reading short message can be directly deleted after the short message is received and the dialog box is closed. Although the privacy of the short messages may be increased, it could be transmitted in only one transmission mode to all the recipients when bulk messaging. For example, if a short message is transmitted in the disappear-after-reading mode when bulk messaging, it is transmitted in the disappear-after-reading mode even if disappear-after-reading is not supported by a few recipients among the multiple recipients. Then, the recipients not supporting disappear-after-reading will not receive the short message and the short message sent by the terminal is lost.

SUMMARY

The present disclosure provides a new information transmitting technology by which, when bulk messaging, different short message transmission modes can be selected based on whether disappear-after-reading is supported by recipients, thus increasing the flexibility of bulk messaging.

According to the first aspect of the present disclosure, an information transmitting device is provided. The information transmitting device, comprises: a selection unit for selecting multiple pieces of target recipient information and a target transmission mode for a to-be-transmitted short message on the basis of a selection command received, wherein the target transmission modes include a disappear-after-reading transmission mode and a direct transmission mode; a first determination unit for determining whether the target transmission mode for the to-be-transmitted short message is the disappear-after-reading transmission mode; a second determination unit for determining respectively, when the target transmission mode is the disappear-after-reading transmission mode, whether disappear-after-reading is currently supported by an information receiving device corresponding to each piece of target recipient information among the multiple pieces of target recipient information; and a processing unit for transmitting the to-be-transmitted short message in the disappear-after-reading transmission mode to the information receiving device when disappear-after-reading is currently supported by the information receiving device, and transmitting the to-be-transmitted short message in the direct transmission mode to the information receiving device when disappear-after-reading is not currently supported by the information receiving device.

In this technical solution, when the short message is transmitted in the disappear-after-reading mode, the multiple recipients may be selected as the receivers of the short message on the basis of the selection command, that is to say, bulk messaging in the disappear-after-reading mode. And the short message transmission mode for each recipient among the multiple recipients may be selected on the basis of whether the each recipient is currently able to receive the disappear-after-reading short message. The short message is transmitted in the disappear-after-reading mode to the recipients able to receive the disappear-after-reading short message, and is transmitted in the direct mode to the recipients unable to receive the disappear-after-reading short message. However, when selecting the recipients, no matter whether disappear-after-reading is currently supported by the recipients, they may be selected as the receivers of the to-be-transmitted short message, such that different short message transmission modes may be selected on the basis of whether disappear-after-reading is supported by the recipients when bulk messaging in the disappear-after-reading mode. Compared to being able to transmit only in the disappear-after-reading mode when bulk messaging in the disappear-after-reading mode in prior art, it is ensured that all the receivers could receive the short message, and the flexibility of bulk messaging is increased, avoiding the lost of the disappear-after-reading short message transmitted when disappear-after-reading is not supported by the receivers.

The short message may be a ordinary paid short message, or a free short message transmitted via network, or a short message of other kinds, and is not limited herein.

In the above technical solution, for example, the disappear-after-reading transmission mode comprises: adding a disappear-after-reading tag to the to-be-transmitted short message, and transmitting the to-be-transmitted short message with the disappear-after-reading tag; the direct transmission mode comprises: directly transmitting the to-be-transmitted short message.

In this technical solution, by adding the disappear-after-reading tag to the to-be-transmitted short message to be transmitted to the recipients supporting disappear-after-reading, facilitating distinguishing from the to-be-transmitted short message to be transmitted to the recipients not supporting disappear-after-reading, the transmission modes for the to-be-transmitted short message to be transmitted to the all the recipients may be visually viewed, so as to reminder the user that the short message with the disappear-after-reading tag will be transmitted in the disappear-after-reading mode and the short message without the disappear-after-reading tag will be transmitted in the normal mode (direct transmission mode).

The disappear-after-reading tag may be a special marker, for example, ♦, that is to say, "♦" may be added to the position of the first character in the short message when the disappear-after-reading tag is added to the short message. Of course, those skilled in the art will appreciate that the disappear-after-reading tag and the position for adding it to the short message have other forms, and is not particularly limited herein.

In the above technical solution, for example, the second determination unit comprises: a determination unit for determining whether the information receiving device is currently online or has been registered, and when the information receiving device is online or has been registered, determining that disappear-after-reading is currently supported by the information receiving device, and when the information receiving device is not online or not registered, determining that disappear-after-reading is not currently supported by the information receiving device.

In this technical solution, by determining whether disappear-after-reading is supported by the receivers before transmitting the disappear-after-reading short message, and transmitting it in the disappear-after-reading mode to the receivers supporting disappear-after-reading, transmitting it in the normal mode to the receivers not supporting disappear-after-reading, it is ensured that all the receivers could receive the short message, avoiding the lost of the disappear-after-reading short message transmitted when disappear-after-reading is not supported by the receivers.

A recipient number may be used as a key to inquire in a cloud server whether the recipient is online or has registered, and it is determined whether disappear-after-reading is supported by a terminal, by determining whether the terminal has been registered or is online (in a initiated or log-in state). If the terminal is not registered or not online, it is determined that disappear-after-reading is not supported; if the terminal has been registered and is online, it is determined that disappear-after-reading is supported.

The above technical solution can further comprise a tag adding unit for, when disappear-after-reading is supported by the information receiving device, adding a tag of supporting disappear-after-reading to the recipient information corresponding to the information receiving device, and when disappear-after-reading is not supported by the information receiving device, adding a tag of not supporting disappear-after-reading to the recipient information corresponding to the information receiving device. And the second determination unit is further for determining respectively whether the disappear-after-reading tag is contained in each piece of target recipient information, and when the disappear-after-reading tag is contained in the target recipient information, determining that disappear-after-reading is currently supported by the information receiving device, and when the disappear-after-reading tag is not contained in the target recipient information, determining that disappear-after-reading is not currently supported by the information receiving device.

In this technical solution, after inquiring whether disappear-after-reading is supported by the recipient, the tag of supporting disappear-after-reading is added to the recipient information supporting disappear-after-reading, and the tag of not supporting disappear-after-reading is added to the recipient information not supporting disappear-after-reading, such that the short message transmission mode for the selected recipients may be known when selecting recipients, facilitating selecting recipients on the basis of the privacy of the to-be-transmitted short message.

Specifically, for example, if the privacy of bulk messaging is high, the short message should be transmitted in the disappear-after-reading mode, and meanwhile, the recipients may be selected from those with the disappear-after-reading tag. Consequently, the short message is transmitted in the disappear-after-reading mode when bulk messaging. If the privacy of bulk messaging is not high, the short message may be transmitted in the disappear-after-reading and/or normal mode, and meanwhile, the recipients may be selected no matter whether they have the disappear-after-reading tag or does not support disappear-after-reading. Consequently, when the short message is transmitted, the transmission mode may be automatically selected on the basis of whether the recipients support disappear-after-reading.

According to the second aspect of the present disclosure, an information receiving device is provided. The information receiving device, comprises: a reception unit for receiving a short message transmitted by an information transmitting device; a determination unit for determining whether a disappear-after-reading tag is contained in the short message; and a processing unit for, if the disappear-after-reading tag is contained in the short message, deleting the content of the short message on the basis of a close command received, after the short message is opened.

In this technical solution, by determining whether a disappear-after-reading tag is contained in the received short message, and waiting for the user to read the disappear-after-reading short message if the disappear-after-reading tag is contained in the received short message, and directly deleting the short message containing the disappear-after-reading tag without saving it when a command of closing a short message display interface is received, the content of the short message is prevented from being divulged, and the privacy of the short message is greatly increased.

The above technical solution can further comprise a display unit for displaying the received short message containing the disappear-after-reading tag. When the short message is not opened, it is displayed in a first display style; when the short message is opened, it is displayed in a second display style.

In this technical solution, by displaying the short message containing the disappear-after-reading tag in two display styles respectively when it is opened or not, it is may be visually displayed whether the short message has been opened.

When a plurality of disappear-after-reading short messages are received simultaneously, whether each of the plurality of short messages has been opened is determined by means of the display style, that is to say, whether the short message is deleted is determined. If the short message is displayed in the first display style, it is not opened and may be viewed; if the short message is opened and a message reading interface is closed, it is displayed in the second display style. When the short message is displayed in the second display style, the short message including the transmitter, the transmitting time thereof and the content thereof and so on, could not be viewed even if it is clicked by the user, because the content thereof has been deleted.

The above technical solution can further comprise a setting unit for setting the first display style and/or the second display style on the basis of a setting command received.

In this technical solution, the first display style and the second display style may be set freely, and the flexibility of the display styles is enhanced. For example, the first display style may be set to be a sealed envelope style, and the second display style may be set to be an empty envelope style. Alternatively, the first display style may be set to be an envelope style with a disappear-after-reading tag, and the second display style may be set to be a torn envelope style. Of course, the display style has many kinds which are not listed herein.

According to the third aspect of the present disclosure, an information transmitting method is provided. The information transmitting method, comprises: selecting multiple pieces of target recipient information and a target transmission mode for a to-be-transmitted short message on the basis of a selection command received, wherein the target transmission modes include a disappear-after-reading transmission mode and a direct transmission mode; determining whether the target transmission mode for the to-be-transmitted short message is the disappear-after-reading transmission mode; determining respectively, when the target transmission mode is the disappear-after-reading transmission mode, whether disappear-after-reading is currently supported by an information receiving device corresponding to each piece of target recipient information among the multiple pieces of target recipient information; and transmitting the to-be-transmitted short message in the disappear-after-reading transmission mode to the information receiving device when disappear-after-reading is currently supported by the information receiving device, and transmitting the to-be-transmitted short message in the direct transmission mode to the information receiving device when disappear-after-reading is not currently supported by the information receiving device.

In this technical solution, when the short message is transmitted in the disappear-after-reading mode, the multiple recipients may be selected as the receivers of the short message on the basis of the selection command, that is to say, bulk messaging in the disappear-after-reading mode. And the short message transmission mode for each recipient among the multiple recipients may be selected on the basis of whether the each recipient is currently able to receive the disappear-after-reading short message. The short message is transmitted in the disappear-after-reading mode to the recipients able to receive the disappear-after-reading short message, and is transmitted in the direct mode to the recipients unable to receive the disappear-after-reading short message. However, when selecting the recipients, no matter whether disappear-after-reading is currently supported by the recipients, they may be selected as the receivers of the to-be-transmitted short message, such that different short message transmission modes may be selected on the basis of whether disappear-after-reading is supported by the recipients when bulk messaging in the disappear-after-reading mode. Compared to being able to transmit only in the disappear-after-reading mode when bulk messaging in the disappear-after-reading mode in prior art, it is ensured that all the receivers could receive the short message, and the flexibility of bulk messaging is increased, avoiding the loss of the disappear-after-reading short message transmitted when disappear-after-reading is not supported by the receivers.

In the above technical solution, for example, the disappear-after-reading transmission mode comprises: adding a disappear-after-reading tag to the to-be-transmitted short message, and transmitting the to-be-transmitted short message with the disappear-after-reading tag; the direct transmission mode comprises: directly transmitting the to-be-transmitted short message.

In this technical solution, by adding the disappear-after-reading tag to the to-be-transmitted short message to be transmitted to the recipients supporting disappear-after-reading, facilitating distinguishing from the to-be-transmitted short message to be transmitted to the recipients not supporting disappear-after-reading, the transmission modes for the to-be-transmitted short message to be transmitted to the all the recipients may be visually viewed, so as to reminder the user that the short message with the disappear-after-reading tag will be transmitted in the disappear-after-reading mode and the short message without the disappear-after-reading tag will be transmitted in the normal mode.

The disappear-after-reading tag may be a special marker, for example, ♦, that is to say, "♦" may be added to the position of the first character in the short message when the disappear-after-reading tag is added to the short message. Of course, those skilled in the art will appreciate that the disappear-after-reading tag and the position for adding it to the short message have other forms, and is not particularly limited herein.

In the above technical solution, for example, determining respectively, when the target transmission mode is the disappear-after-reading transmission mode, whether disappear-after-reading is currently supported by an information receiving device corresponding to each piece of target recipient information among the multiple pieces of target recipient information, specifically comprises: determining whether the information receiving device is currently online or has been registered; when the information receiving device is online or has been registered, determining that disappear-after-reading is currently supported by the information receiving device; when the information receiving device is not online or not registered, determining that disappear-after-reading is not currently supported by the information receiving device.

In this technical solution, by determining whether disappear-after-reading is supported by the receivers before transmitting the disappear-after-reading short message, and transmitting it in the disappear-after-reading mode to the receivers supporting disappear-after-reading, transmitting it in the normal mode to the receivers not supporting disappear-after-reading, it is ensured that all the receivers could receive the short message, avoiding the lost of the disappear-after-reading short message transmitted when disappear-after-reading is not supported by the receivers.

A recipient number may be used as a key to inquire in a cloud server whether the recipient is online or has registered, and it is determined whether disappear-after-reading is supported by a terminal, by determining whether the terminal has been registered or is online (in a initiated or log-in state). If the terminal is not registered or not online, it is determined that disappear-after-reading is not supported; if the terminal has been registered and is online, it is determined that disappear-after-reading is supported.

The above technical solution can further comprise: when disappear-after-reading is supported by the information receiving device, adding a tag of supporting disappear-after-reading to the recipient information corresponding to the information receiving device, and when disappear-after-reading is not supported by the information receiving device, adding a tag of not supporting disappear-after-reading to the recipient information corresponding to the information receiving device; and determining respectively whether the disappear-after-reading tag is contained in each piece of target recipient information, and when the disappear-after-reading tag is contained in the target recipient information, determining that disappear-after-reading is currently supported by the information receiving device, and when the disappear-after-reading tag is not contained in the target recipient information, determining that disappear-after-reading is not currently supported by the information receiving device.

In this technical solution, after inquiring whether disappear-after-reading is supported by the recipient, the tag of supporting disappear-after-reading is added to the recipient information supporting disappear-after-reading, and the tag of not supporting disappear-after-reading is added to the recipient information not supporting disappear-after-reading, such that the short message transmission mode for the selected recipients may be known when selecting recipients, facilitating selecting recipients on the basis of the privacy of the to-be-transmitted short message.

Specifically, for example, if the privacy of bulk messaging is high, the short message should be transmitted in the disappear-after-reading mode, and meanwhile, the recipients may be selected from those with the disappear-after-reading tag. Consequently, the short message is transmitted in the disappear-after-reading mode when bulk messaging. If the privacy of bulk messaging is not high, the short message may be transmitted in the disappear-after-reading and/or normal mode, and meanwhile, the recipients may be selected no matter whether they have the disappear-after-reading tag or does not support disappear-after-reading. Consequently, when the short message is transmitted, the transmission mode may be automatically selected on the basis of whether the recipients support disappear-after-reading.

According to the fourth aspect of the present disclosure, an information receiving method is provided. The information receiving method, comprises: receiving a short message transmitted by an information transmitting device; determining whether a disappear-after-reading tag is contained in the short message; and, if the disappear-after-reading tag is contained in the short message, deleting the content of the short message on the basis of a close command received, after the short message is opened.

In this technical solution, by determining whether a disappear-after-reading tag is contained in the received short message, and waiting for the user to read the disappear-after-reading short message if the disappear-after-reading tag is contained in the received short message, and directly deleting the short message containing the disappear-after-reading tag without saving it when a command of closing a short message display interface is received, the content of the short message is prevented from being divulged, and the privacy of the short message is greatly increased.

The above technical solution can further comprise displaying the received short message containing the disappear-after-reading tag. When the short message is not opened, it is displayed in a first display style; when the short message is opened, it is displayed in a second display style.

In this technical solution, by displaying the short message containing the disappear-after-reading tag in two display styles respectively when it is opened or not, it is may be visually displayed whether the short message has been opened.

When a plurality of disappear-after-reading short messages are received simultaneously, whether each of the plurality of short messages has been opened is determined by means of the display style, that is to say, whether the short message is deleted is determined. If the short message is displayed in the first display style, it is not opened and may be viewed; if the short message is opened and a message reading interface is closed, it is displayed in the second display style. When the short message is displayed in the second display style, the short message including the transmitter, the transmitting time thereof and the content thereof and so on, could not be viewed even if it is clicked by the user, because the content thereof has been deleted.

The above technical solution can further comprise setting the first display style and/or the second display style on the basis of a setting command received.

In this technical solution, the first display style and the second display style may be set freely, and the flexibility of the display styles is enhanced. For example, the first display style may be set to be a sealed envelope style, and the second display style may be set to be an empty envelope style. Alternatively, the first display style may be set to be an envelope style with a disappear-after-reading tag, and the second display style may be set to be a torn envelope style. Of course, the display style has many kinds which are not listed herein.

DETAILED DESCRIPTION

The present disclosure is further described in detail hereinafter with reference to the drawings and the implementations, in order to more fully understand above-mentioned purposes, features and advantages of the present disclosure. It should be noted that, when not conflicting, the implementations of the present application and features in the implementations could be combined mutually.

A lot of details are set forth in the below description so as to fully understand the present disclosure, however, the present disclosure may also be implemented by adopting other implementations different from those as described herein, and therefore, the scope of the present disclosure is not limited by the implementations disclosed below.

Figure 1:
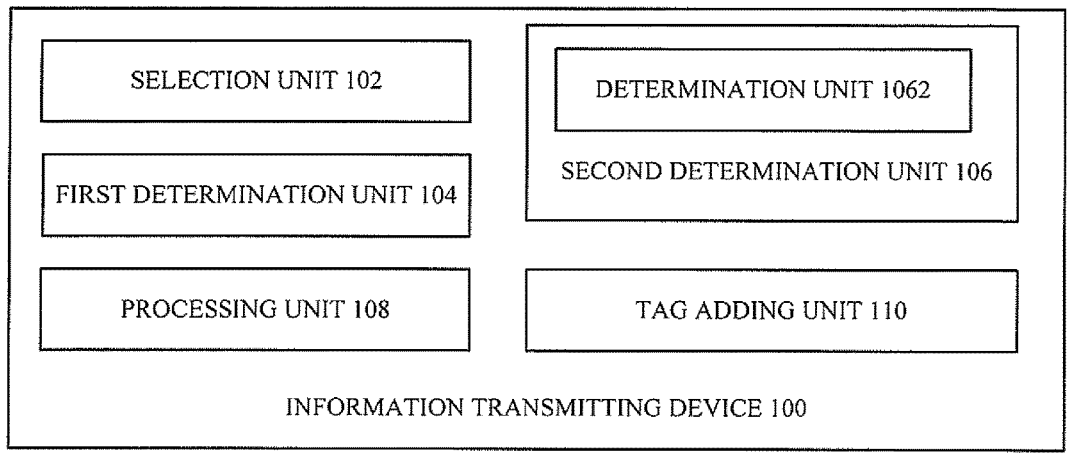
FIG. 1 shows a schematic structural diagram of an information transmitting device according to an implementation of the present disclosure.

FIG. 1 shows a schematic structural diagram of an information transmitting device according to an implementation of the present disclosure.

As shown in FIG. 1, the information transmitting device 100 according to an implementation of the present disclosure, comprises: a selection unit 102 for selecting multiple pieces of target recipient information and a target transmission mode for a to-be-transmitted short message on the basis of a selection command received, wherein the target transmission modes include a disappear-after-reading transmission mode and a direct transmission mode; a first determination unit 104 for determining whether the target transmission mode for the to-be-transmitted short message is the disappear-after-reading transmission mode; a second determination unit 106 for determining respectively, when the target transmission mode is the disappear-after-reading transmission mode, whether disappear-after-reading is currently supported by an information receiving device corresponding to each piece of target recipient information among the multiple pieces of target recipient information; and a processing unit 108 for transmitting the to-be-transmitted short message in the disappear-after-reading transmission mode to the information receiving device when disappear-after-reading is currently supported by the information receiving device, and transmitting the to-be-transmitted short message in the direct transmission mode to the information receiving device when disappear-after-reading is not currently supported by the information receiving device.

In this implementation, when the short message is transmitted in the disappear-after-reading mode, the multiple recipients may be selected as the receivers of the short message on the basis of the selection command, that is to say, bulk messaging in the disappear-after-reading mode. And the short message transmission mode for each recipient among the multiple recipients may be selected on the basis of whether the each recipient is currently able to receive the disappear-after-reading short message. The short message is transmitted in the disappear-after-reading mode to the recipients able to receive the disappear-after-reading short message, and is transmitted in the direct mode to the recipients unable to receive the disappear-after-reading short message. However, when selecting the recipients, no matter whether disappear-after-reading is currently supported by the recipients, they may be selected as the receivers of the to-be-transmitted short message, such that different short message transmission modes may be selected on the basis of whether disappear-after-reading is supported by the recipients when bulk messaging in the disappear-after-reading mode. Compared to being able to transmit only in the disappear-after-reading mode when bulk messaging in the disappear-after-reading mode in prior art, it is ensured that all the receivers could receive the short message, and the flexibility of bulk messaging is increased, avoiding the lost of the disappear-after-reading short message transmitted when disappear-after-reading is not supported by the receivers.

In the above implementation, for example, the disappear-after-reading transmission mode comprises: adding a disappear-after-reading tag to the to-be-transmitted short message, and transmitting the to-be-transmitted short message with the disappear-after-reading tag; the direct transmission mode comprises: directly transmitting the to-be-transmitted short message.

In this implementation, by adding the disappear-after-reading tag to the to-be-transmitted short message to be transmitted to the recipients supporting disappear-after-reading, facilitating distinguishing from the to-be-transmitted short message to be transmitted to the recipients not supporting disappear-after-reading, the transmission modes for the to-be-transmitted short message to be transmitted to the all the recipients may be visually viewed, so as to reminder the user that the short message with the disappear-after-reading tag will be transmitted in the disappear-after-reading mode and the short message without the disappear-after-reading tag will be transmitted in the normal mode (direct transmission mode).

The disappear-after-reading tag may be a special marker, for example, ♦, that is to say, "♦" may be added to the position of the first character in the short message when the disappear-after-reading tag is added to the short message. Of course, those skilled in the art will appreciate that the disappear-after-reading tag and the position for adding it to the short message have other forms, and is not particularly limited herein.

In the above implementation, for example, the second determination unit 106 comprises: a determination unit 1062 for determining whether the information receiving device is currently online or has been registered, and when the information receiving device is online or has been registered, determining that disappear-after-reading is currently supported by the information receiving device, and when the information receiving device is not online or not registered, determining that disappear-after-reading is not currently supported by the information receiving device.

In this implementation, by determining whether disappear-after-reading is supported by the receivers before transmitting the disappear-after-reading short message, and transmitting it in the disappear-after-reading mode to the receivers supporting disappear-after-reading, transmitting it in the normal mode to the receivers not supporting disappear-after-reading, it is ensured that all the receivers could receive the short message, avoiding the lost of the disappear-after-reading short message transmitted when disappear-after-reading is not supported by the receivers.

A recipient number may be used as a key to inquire in a cloud server whether the recipient is online or has registered, and it is determined whether disappear-after-reading is supported by a terminal, by determining whether the terminal has been registered or is online (in a initiated or log-in state). If the terminal is not registered or not online, it is determined that disappear-after-reading is not supported; if the terminal has been registered and is online, it is determined that disappear-after-reading is supported.

In the above implementation, it can further comprise a tag adding unit 110 for, when disappear-after-reading is supported by the information receiving device, adding a tag of supporting disappear-after-reading to the recipient information corresponding to the information receiving device, and when disappear-after-reading is not supported by the information receiving device, adding a tag of not supporting disappear-after-reading to the recipient information corresponding to the information receiving device. And the second determination unit 106 is further for determining respectively whether the disappear-after-reading tag is contained in each piece of target recipient information, and when the disappear-after-reading tag is contained in the target recipient information, determining that disappear-after-reading is currently supported by the information receiving device, and when the disappear-after-reading tag is not contained in the target recipient information, determining that disappear-after-reading is not currently supported by the information receiving device.

In this implementation, after inquiring whether disappear-after-reading is supported by the recipient, the tag of supporting disappear-after-reading is added to the recipient information supporting disappear-after-reading, and the tag of not supporting disappear-after-reading is added to the recipient information not supporting disappear-after-reading, such that the short message transmission mode for the selected recipients may be known when selecting recipients, facilitating selecting recipients on the basis of the privacy of the to-be-transmitted short message.

Specifically, for example, if the privacy of bulk messaging is high, the short message should be transmitted in the disappear-after-reading mode, and meanwhile, the recipients may be selected from those with the disappear-after-reading tag. Consequently, the short message is transmitted in the disappear-after-reading mode when bulk messaging. If the privacy of bulk messaging is not high, the short message may be transmitted in the disappear-after-reading and/or normal mode, and meanwhile, the recipients may be selected no matter whether they have the disappear-after-reading tag or does not support disappear-after-reading. Consequently, when the short message is transmitted, the transmission mode may be automatically selected on the basis of whether the recipients support disappear-after-reading.

Figure 2:
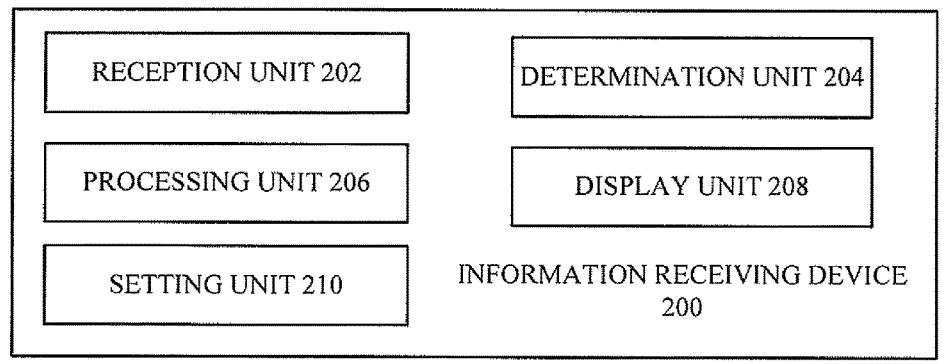
FIG. 2 shows a schematic structural diagram of an information receiving device according to an implementation of the present disclosure.

FIG. 2 shows a schematic structural diagram of an information receiving device according to an implementation of the present disclosure.

As shown in FIG. 2, the information receiving device 200 according to an implementation of the present disclosure, comprises: a reception unit 202 for receiving a short message transmitted by the information transmitting device 100; a determination unit 204 for determining whether a disappear-after-reading tag is contained in the short message; and a processing unit 206 for, if the disappear-after-reading tag is contained in the short message, deleting the content of the short message on the basis of a close command received, after the short message is opened.

In this implementation, by determining whether a disappear-after-reading tag is contained in the received short message, and waiting for the user to read the disappear-after-reading short message if the disappear-after-reading tag is contained in the received short message, and directly deleting the short message containing the disappear-after-reading tag without saving it when a command of closing a short message display interface is received, the content of the short message is prevented from being divulged, and the privacy of the short message is greatly increased.

In the above implementation, it can further comprise a display unit 208 for displaying the received short message containing the disappear-after-reading tag. When the short message is not opened, it is displayed in a first display style; when the short message is opened, it is displayed in a second display style.

In this implementation, by displaying the short message containing the disappear-after-reading tag in two display styles respectively when it is opened or not, it is may be visually displayed whether the short message has been opened.

When a plurality of disappear-after-reading short messages are received simultaneously, whether each of the plurality of short messages has been opened is determined by means of the display style, that is to say, whether the short message is deleted is determined. If the short message is displayed in the first display style, it is not opened and may be viewed; if the short message is opened and a message reading interface is closed, it is displayed in the second display style. When the short message is displayed in the second display style, the short message including the transmitter, the transmitting time thereof and the content thereof and so on, could not be viewed even if it is clicked by the user, because the content thereof has been deleted.

In the above implementation, it can further comprise a setting unit 210 for setting the first display style and/or the second display style on the basis of a setting command received.

In this implementation, the first display style and the second display style may be set freely, and the flexibility of the display styles is enhanced. For example, the first display style may be set to be a sealed envelope style, and the second display style may be set to be an empty envelope style. Alternatively, the first display style may be set to be an envelope style with a disappear-after-reading tag, and the second display style may be set to be a torn envelope style. Of course, the display style has many kinds which are not listed herein.

Figure 3:
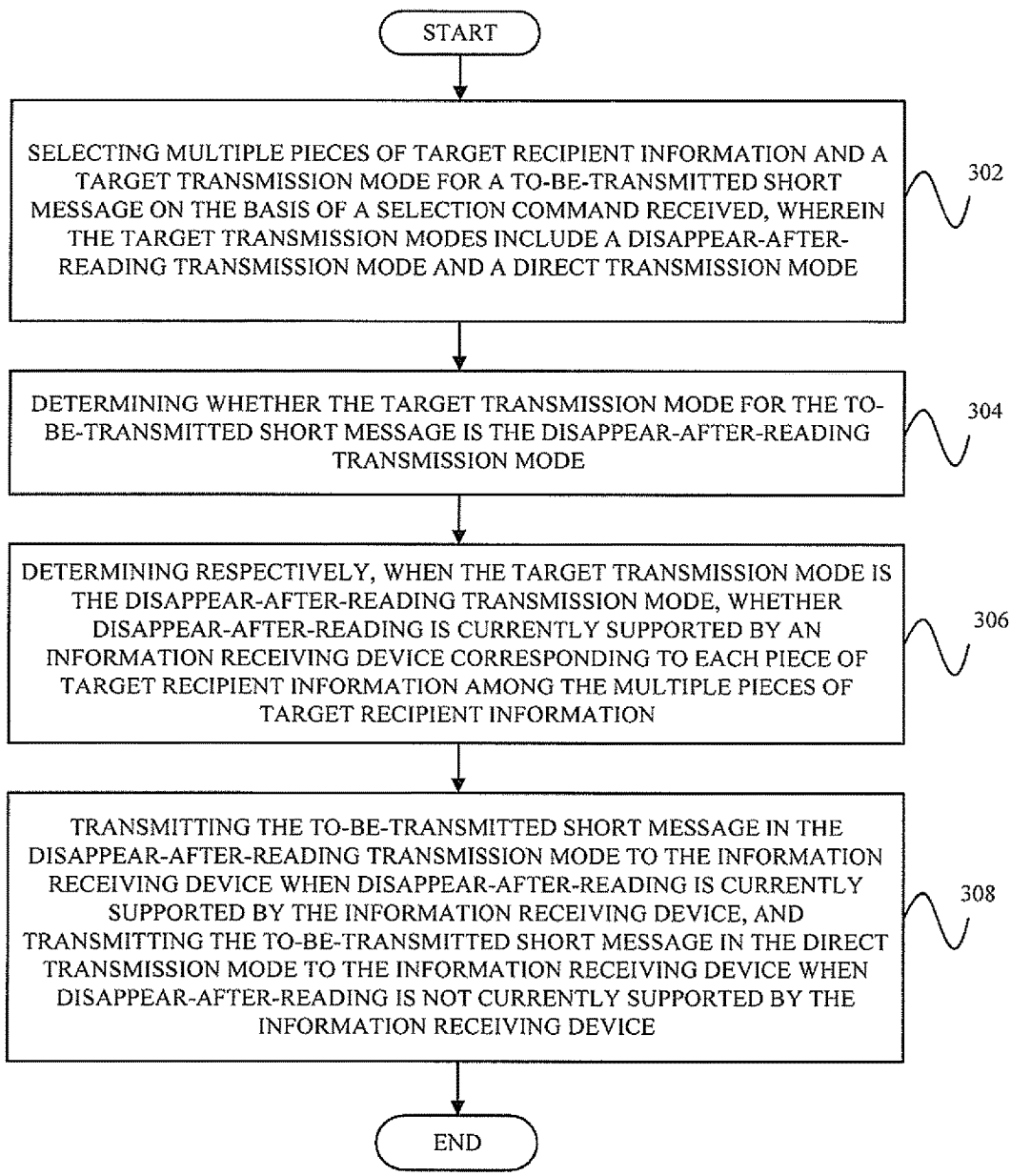
FIG. 3 shows a schematic flowchart of an information transmitting method according to an implementation of the present disclosure.

FIG. 3 shows a schematic flowchart of an information transmitting method according to an implementation of the present disclosure.

As shown in FIG. 3, the information transmitting method according to an implementation of the present disclosure, comprises: a step 302 of selecting multiple pieces of target recipient information and a target transmission mode for a to-be-transmitted short message on the basis of a selection command received, wherein the target transmission modes include a disappear-after-reading transmission mode and a direct transmission mode; a step 304 of determining whether the target transmission mode for the to-be-transmitted short message is the disappear-after-reading transmission mode; a step 306 of determining respectively, when the target transmission mode is the disappear-after-reading transmission mode, whether disappear-after-reading is currently supported by an information receiving device corresponding to each piece of target recipient information among the multiple pieces of target recipient information; and a step 308 of transmitting the to-be-transmitted short message in the disappear-after-reading transmission mode to the information receiving device when disappear-after-reading is currently supported by the information receiving device, and transmitting the to-be-transmitted short message in the direct transmission mode to the information receiving device when disappear-after-reading is not currently supported by the information receiving device.

In this implementation, when the short message is transmitted in the disappear-after-reading mode, the multiple recipients may be selected as the receivers of the short message on the basis of the selection command, that is to say, bulk messaging in the disappear-after-reading mode. And the short message transmission mode for each recipient among the multiple recipients may be selected on the basis of whether the each recipient is currently able to receive the disappear-after-reading short message. The short message is transmitted in the disappear-after-reading mode to the recipients able to receive the disappear-after-reading short message, and is transmitted in the direct mode to the recipients unable to receive the disappear-after-reading short message. However, when selecting the recipients, no matter whether disappear-after-reading is currently supported by the recipients, they may be selected as the receivers of the to-be-transmitted short message, such that different short message transmission modes may be selected on the basis of whether disappear-after-reading is supported by the recipients when bulk messaging in the disappear-after-reading mode. Compared to being able to transmit only in the disappear-after-reading mode when bulk messaging in the disappear-after-reading mode in prior art, it is ensured that all the receivers could receive the short message, and the flexibility of bulk messaging is increased, avoiding the lost of the disappear-after-reading short message transmitted when disappear-after-reading is not supported by the receivers.

In the above implementation, for example, the disappear-after-reading transmission mode comprises: adding a disappear-after-reading tag to the to-be-transmitted short message, and transmitting the to-be-transmitted short message with the disappear-after-reading tag; the direct transmission mode comprises: directly transmitting the to-be-transmitted short message.

In this implementation, by adding the disappear-after-reading tag to the to-be-transmitted short message to be transmitted to the recipients supporting disappear-after-reading, facilitating distinguishing from the to-be-transmitted short message to be transmitted to the recipients not supporting disappear-after-reading, the transmission modes for the to-be-transmitted short message to be transmitted to the all the recipients may be visually viewed, so as to reminder the user that the short message with the disappear-after-reading tag will be transmitted in the disappear-after-reading mode and the short message without the disappear-after-reading tag will be transmitted in the normal mode.

The disappear-after-reading tag may be a special marker, for example, ♦, that is to say, "♦" may be added to the position of the first character in the short message when the disappear-after-reading tag is added to the short message. Of course, those skilled in the art will appreciate that the disappear-after-reading tag and the position for adding it to the short message have other forms, and is not particularly limited herein.

In the above implementation, for example, determining respectively, when the target transmission mode is the disappear-after-reading transmission mode, whether disappear-after-reading is currently supported by an information receiving device corresponding to each piece of target recipient information among the multiple pieces of target recipient information, specifically comprises: determining whether the information receiving device is currently online or has been registered; when the information receiving device is online or has been registered, determining that disappear-after-reading is currently supported by the information receiving device; when the information receiving device is not online or not registered, determining that disappear-after-reading is not currently supported by the information receiving device.

In this implementation, by determining whether disappear-after-reading is supported by the receivers before transmitting the disappear-after-reading short message, and transmitting it in the disappear-after-reading mode to the receivers supporting disappear-after-reading, transmitting it in the normal mode to the receivers not supporting disappear-after-reading, it is ensured that all the receivers could receive the short message, avoiding the lost of the disappear-after-reading short message transmitted when disappear-after-reading is not supported by the receivers.

A recipient number may be used as a key to inquire in a cloud server whether the recipient is online or has registered, and it is determined whether disappear-after-reading is supported by a terminal, by determining whether the terminal has been registered or is online (in a initiated or log-in state). If the terminal is not registered or not online, it is determined that disappear-after-reading is not supported; if the terminal has been registered and is online, it is determined that disappear-after-reading is supported.

Figure 4:
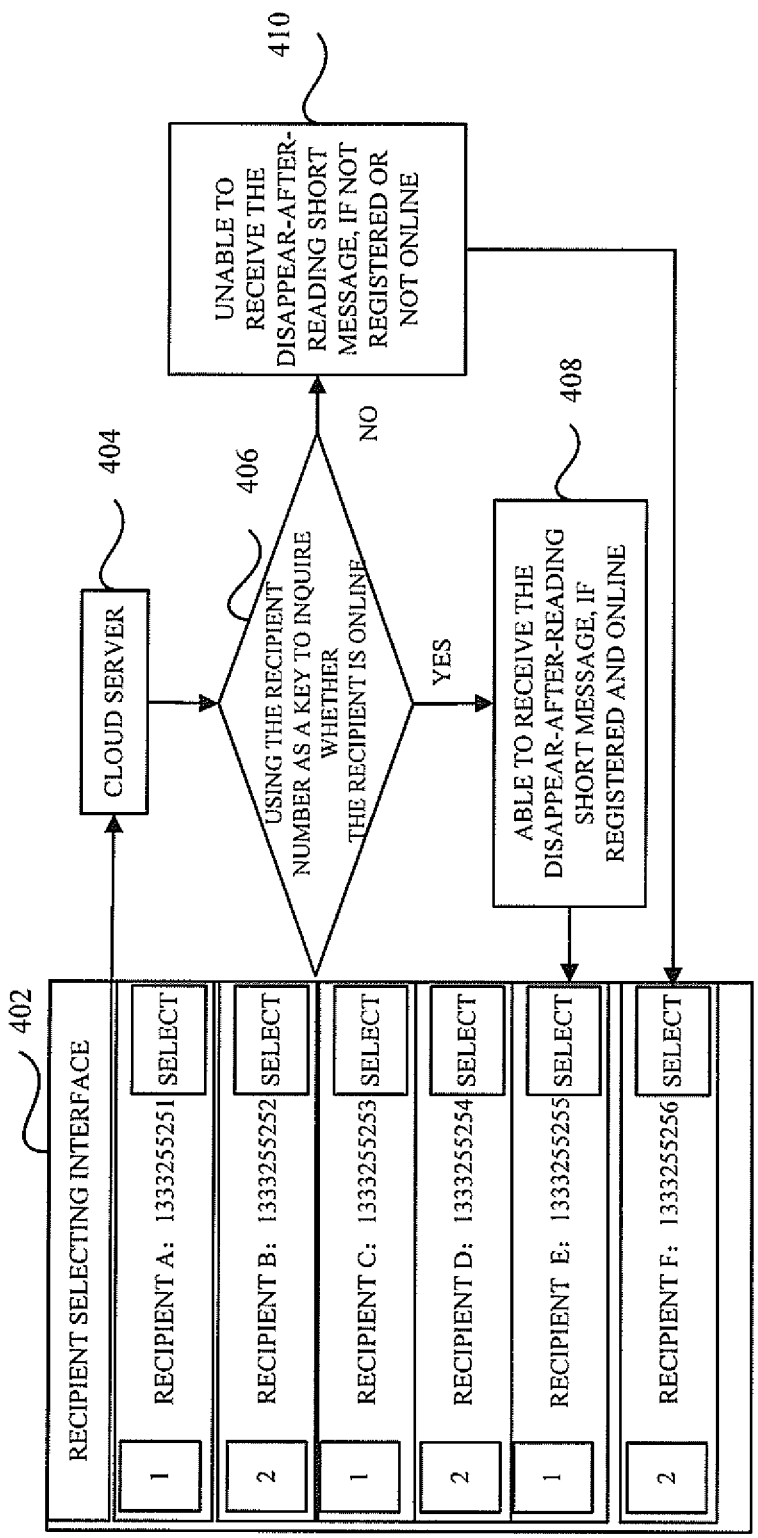
FIG. 4 shows a schematic flowchart of a method according to an implementation of the present disclosure for determining whether disappear-after-reading is supported by a recipient.

A method for determining whether disappear-after-reading is supported by a recipient is specifically explained in conjunction with FIG. 4.

FIG. 4 shows a schematic flowchart of a method according to an implementation of the present disclosure for determining whether disappear-after-reading is supported by a recipient.

As shown in FIG. 4, the specific flowchart of determining whether disappear-after-reading is supported by a recipient is as following.

Step 402: a recipient of a to-be-transmitted short message selected by a user at a recipient selecting interface 402 of a terminal is received.

Step 404: the recipient selecting interface 402 of the terminal is connected to a cloud server 404.

Step 406: the recipient number is used as a key to inquire in the cloud server 404 whether the recipient is online or has registered. If the recipient has registered and is online, it is determined that disappear-after-reading is supported, and step 408 is performed, otherwise step 410 is performed.

Step 408: a disappear-after-reading tag, for example "1" is added to the recipient information if the recipient has registered and is online, and disappear-after-reading is supported.

Step 410: a tag of not supporting disappear-after-reading, for example "2" is added to the recipient information if the recipient has not registered or is not online, and disappear-after-reading is not supported.

Specifically, for example, if the privacy of bulk messaging is high, the short message should be transmitted in the disappear-after-reading mode, and meanwhile, the recipients may be selected from those with the disappear-after-reading tag. Consequently, the short message is transmitted in the disappear-after-reading mode when bulk messaging. If the privacy of bulk messaging is not high, the short message may be transmitted in the disappear-after-reading and/or normal mode, and meanwhile, the recipients may be selected no matter whether they have the disappear-after-reading tag or does not support disappear-after-reading. Consequently, when the short message is transmitted, the transmission mode may be automatically selected on the basis of whether the recipients support disappear-after-reading.

Figure 5:
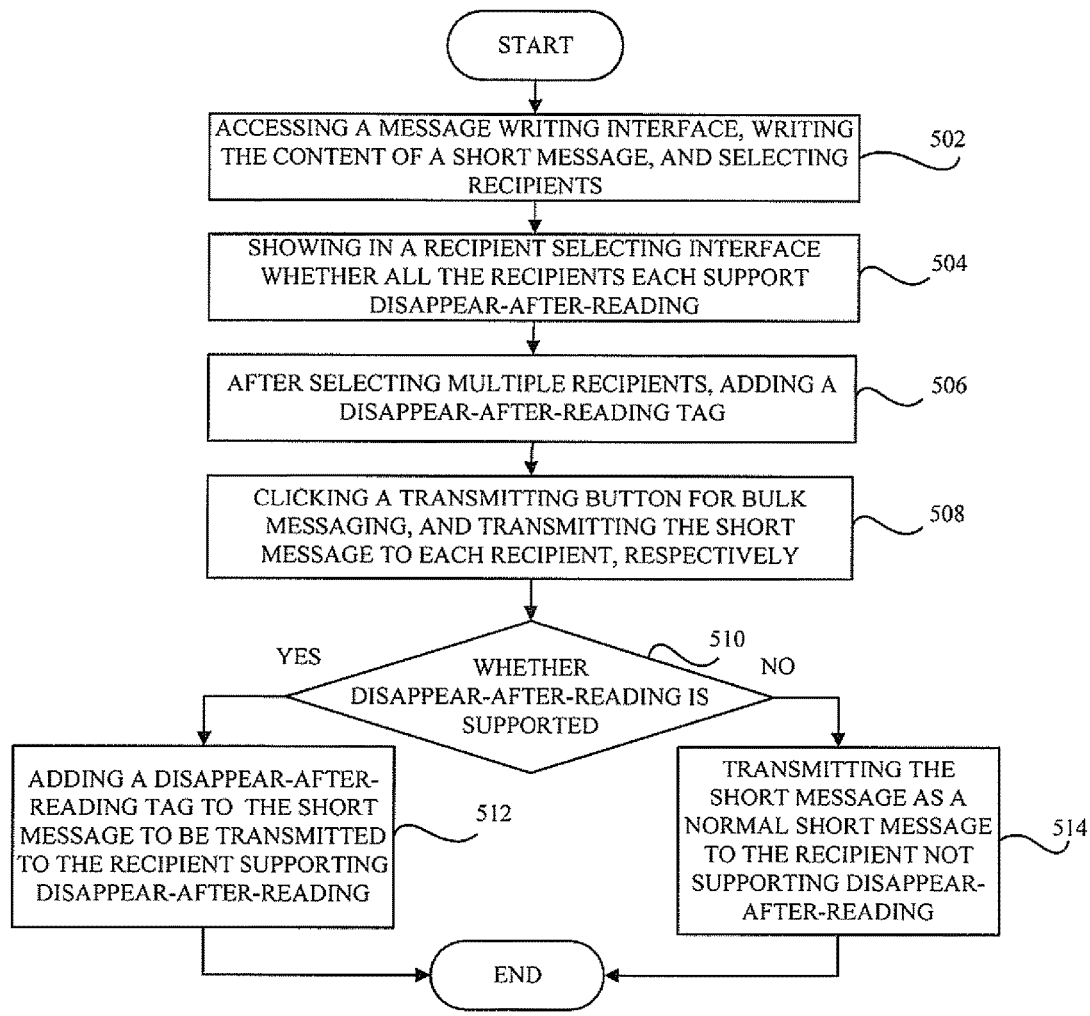
FIG. 5 shows a schematic flowchart of an information transmitting method according to another implementation of the present disclosure.

FIG. 5 shows a schematic flowchart of an information transmitting method according to another implementation of the present disclosure.

As shown in FIG. 5, the specific flowchart of the information transmitting method according to another implementation of the present disclosure is as following.

Step 502: a user normally initiates a message application, accesses a message writing interface, writes the content of a short message, and selects recipients.

Step 504: whether all the recipients each support disappear-after-reading is shown in a recipient selecting interface. Whether disappear-after-reading is supported is inquired in a cloud server by means of a recipient number as a key. The user which has registered and is online supports disappear-after-reading; the user which is not online or does not register does not support disappear-after-reading. The recipients may be selected no matter they support disappear-after-reading.

Step 506: the user after selecting multiple recipients, clicks a menu, and selects a transmission mode. If the transmission mode is a disappear-after-reading transmission mode, a disappear-after-reading tag is added by a terminal; if the transmission mode is a direct transmission mode, the short message is transmitted in normal mode to all the recipients, no matter that whether supporting disappear-after-reading is shown in the recipient selecting interface.

Step 508: the user clicks a transmitting button for bulk messaging and the terminal transmits the short message to each recipient, respectively.

Step 510: whether disappear-after-reading is supported is determined every time the short message is transmitted to one recipient. If disappear-after-reading is supported, step 512 is performed, otherwise step 514 is performed.

Step 512: if disappear-after-reading is supported by the recipient, a disappear-after-reading tag is added to the short message and the short message to be transmitted to the recipient is a disappear-after-reading short message.

Step 514: if disappear-after-reading is not supported, the short message is transmitted as a normal short message and the short message to be transmitted to the recipient is a normal short message.

Figure 6:
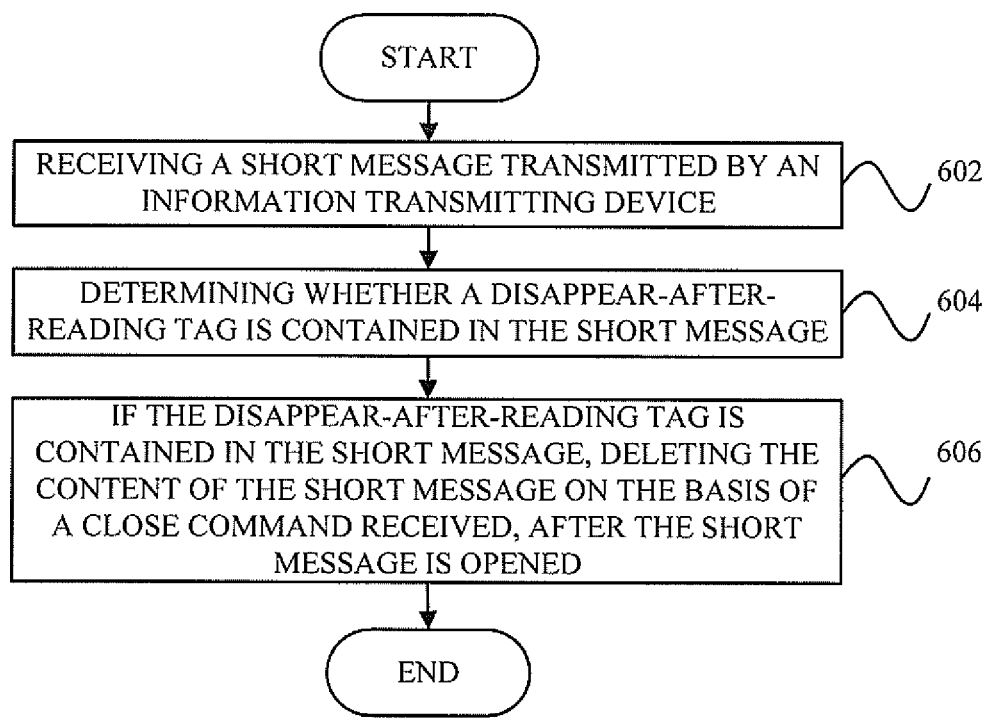
FIG. 6 shows a schematic flowchart of an information receiving method according to an implementation of the present disclosure.

FIG. 6 shows a schematic flowchart of an information receiving method according to an implementation of the present disclosure. The information receiving method according to an implementation of the present disclosure, comprises: a step 602 of receiving a short message transmitted by an information transmitting device; a step 604 of determining whether a disappear-after-reading tag is contained in the short message; and a step 606 of, if the disappear-after-reading tag is contained in the short message, deleting the content of the short message on the basis of a close command received, after the short message is opened.

In this implementation, by determining whether a disappear-after-reading tag is contained in the received short message, and waiting for the user to read the disappear-after-reading short message if the disappear-after-reading tag is contained in the received short message, and directly deleting the short message containing the disappear-after-reading tag without saving it when a command of closing a short message display interface is received, the content of the short message is prevented from being divulged, and the privacy of the short message is greatly increased.

In the above implementation, it can further comprise displaying the received short message containing the disappear-after-reading tag. When the short message is not opened, it is displayed in a first display style; when the short message is opened, it is displayed in a second display style.

In this implementation, by displaying the short message containing the disappear-after-reading tag in two display styles respectively when it is opened or not, it is may be visually displayed whether the short message has been opened.

When a plurality of disappear-after-reading short messages are received simultaneously, whether each of the plurality of short messages has been opened is determined by means of the display style, that is to say, whether the short message is deleted is determined. If the short message is displayed in the first display style, it is not opened and may be viewed; if the short message is opened and a message reading interface is closed, it is displayed in the second display style. When the short message is displayed in the second display style, the short message including the transmitter, the transmitting time thereof and the content thereof and so on, could not be viewed even if it is clicked by the user, because the content thereof has been deleted.

In the above implementation, it can further comprises setting the first display style and/or the second display style on the basis of a setting command received.

In this implementation, the first display style and the second display style may be set freely, and the flexibility of the display styles is enhanced. For example, the first display style may be set to be a sealed envelope style, and the second display style may be set to be an empty envelope style. Alternatively, the first display style may be set to be an envelope style with a disappear-after-reading tag, and the second display style may be set to be a torn envelope style. Of course, the display style has many kinds which are not listed herein.

Figure 7:
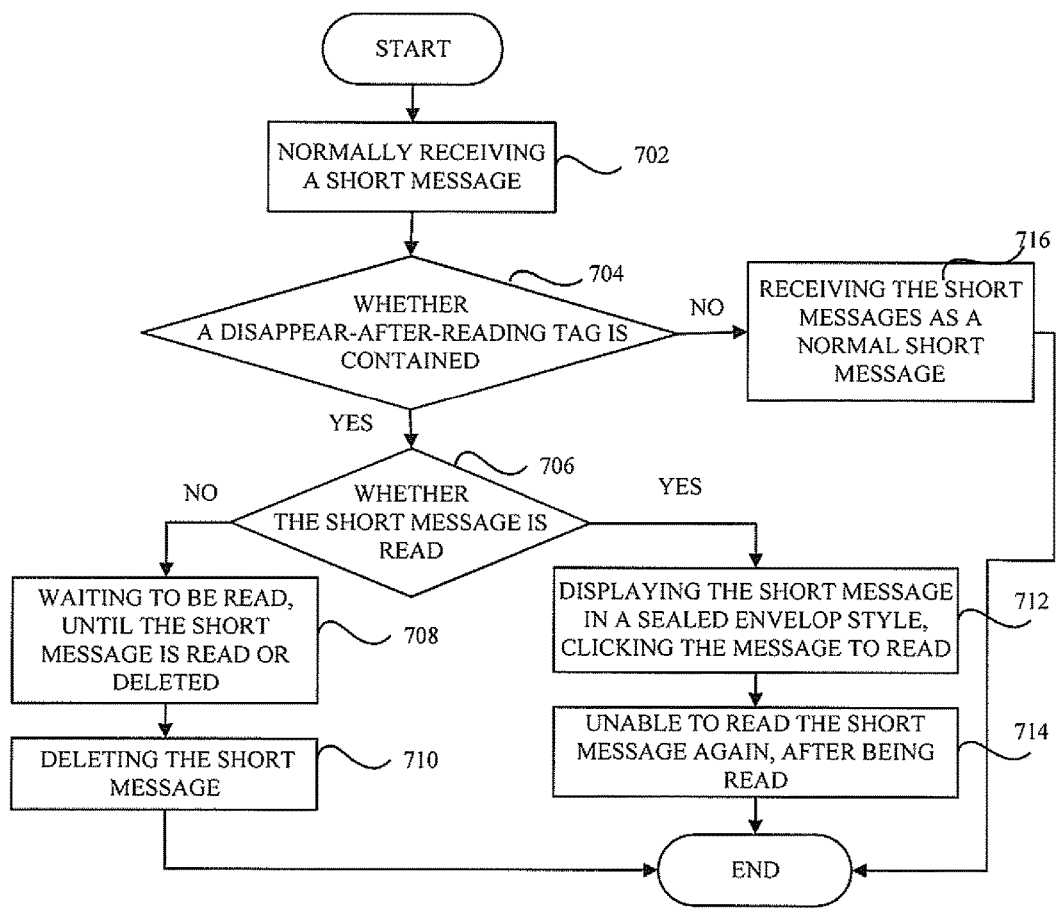
FIG. 7 shows a schematic flowchart of an information receiving method according to another implementation of the present disclosure.

FIG. 7 shows a schematic flowchart of an information receiving method according to another implementation of the present disclosure.

As shown in FIG. 7, the specific flowchart of the information receiving method according to another implementation of the present disclosure is as following.

Step 702: a short message is received normally.

Step 704: whether a disappear-after-reading tag is contained in the short message is determined. If the disappear-after-reading tag is contained in the short message, step 706 is performed, otherwise step 716 is performed.

Step 706: if the disappear-after-reading tag is contained in the short message, it is further determined whether the short message is read. If read, step 712 is performed, otherwise step 708 is performed.

Step 708: if the short message is not read, an unread state (the first display style) is always displayed, waiting to be read.

Step 710: the disappear-after-reading short message may also be deleted similarly to normal short messages, and could not be viewed again after being deleted, no matter whether it is read or unread.

Step 712: if the disappear-after-reading short message needs to be read, the short message is clicked to be read.

Step 714: the state of the short message is changed from an unread one to a read one, after the disappear-after-reading message is viewed and read. A video of burning an envelope may be displayed, indicating disappear-after-reading, when a short message reading interface is closed, and the read message which could not be viewed and read again is displayed in the second display style.

Step 716: if the disappear-after-reading tag is not contained in the short message, the short messages is received as a normal short message.

Figure 8:
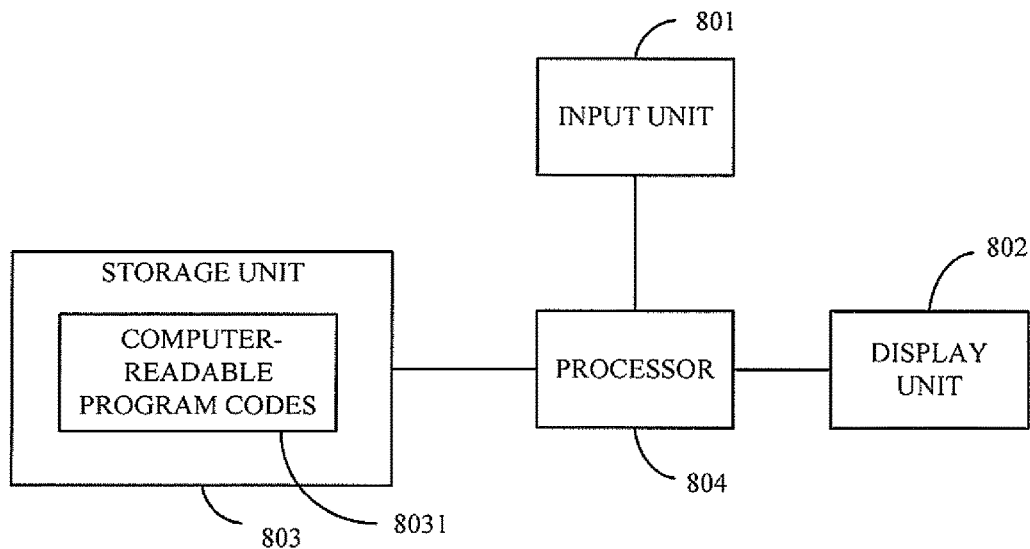
FIG. 8 shows a schematic structural diagram of an information transmitting device according to an implementation of the present disclosure.

FIG. 8 shows a schematic structural diagram of an information transmitting device according to an implementation of the present disclosure.

As shown in FIG. 8, an information transmitting device, according to an implementation of the present disclosure, can include but not limited to an input unit 801, a display unit 802, a storage unit 803, and a processor 804. The input unit 801, the display unit 802, and the storage unit 803 are electrically connected to the processor 804.

The input unit 801 is configured to input information to the information transmitting device, such as letters. The input unit 801 may be but not limited to a physical keyboard, a touchscreen, or a combination of the physical keyboard and the touchscreen.

The display unit 802 is configured to display visual information, such as text, image. The display unit 802 may be an LED display screen.

The storage unit 803 is configured to store a plurality of computer-readable program codes 8031. The storage unit 803 can be a read only memory (ROM), a random access memory (RAM), a U-disk, a removable hard disk, etc.

The processor 804 can include multiple cores for multithread or parallel processing.

In this implementation, the processor 804 is configured to execute the plurality of computer-readable program codes 8031 to select multiple pieces of target recipient information and a target transmission mode for a to-be-transmitted short message on the basis of a selection command received, wherein the target transmission modes include a disappear-after-reading transmission mode and a direct transmission mode; determine whether the target transmission mode for the to-be-transmitted short message is the disappear-after-reading transmission mode; determine respectively, when the target transmission mode is the disappear-after-reading transmission mode, whether disappear-after-reading is currently supported by an information receiving device corresponding to each piece of target recipient information among the multiple pieces of target recipient information; and transmit the to-be-transmitted short message in the disappear-after-reading transmission mode to the information receiving device when disappear-after-reading is currently supported by the information receiving device, and transmitting the to-be-transmitted short message in the direct transmission mode to the information receiving device when disappear-after-reading is not currently supported by the information receiving device.

In this implementation, the disappear-after-reading transmission mode comprises: adding a disappear-after-reading tag to the to-be-transmitted short message, and transmitting the to-be-transmitted short message with the disappear-after-reading tag; the direct transmission mode comprises: directly transmitting the to-be-transmitted short message.

In this implementation, the processor 804 being configured to execute the plurality of computer-readable program codes 8031 to determine respectively, when the target transmission mode is the disappear-after-reading transmission mode, whether disappear-after-reading is currently supported by an information receiving device corresponding to each piece of target recipient information among the multiple pieces of target recipient information, comprises: determining whether the information receiving device is currently online or has been registered; when the information receiving device is online or has been registered, determining that disappear-after-reading is currently supported by the information receiving device; when the information receiving device is not online or not registered, determining that disappear-after-reading is not currently supported by the information receiving device.

In this implementation, the processor 804 is configured to execute the plurality of computer-readable program codes 8031 to, when disappear-after-reading is supported by the information receiving device, add a tag of supporting disappear-after-reading to the recipient information corresponding to the information receiving device, and when disappear-after-reading is not supported by the information receiving device, add a tag of not supporting disappear-after-reading to the recipient information corresponding to the information receiving device; and determine respectively whether the disappear-after-reading tag is contained in each piece of target recipient information, and when the disappear-after-reading tag is contained in the target recipient information, determine that disappear-after-reading is currently supported by the information receiving device, and when the disappear-after-reading tag is not contained in the target recipient information, determine that disappear-after-reading is not currently supported by the information receiving device.

Figure 9:
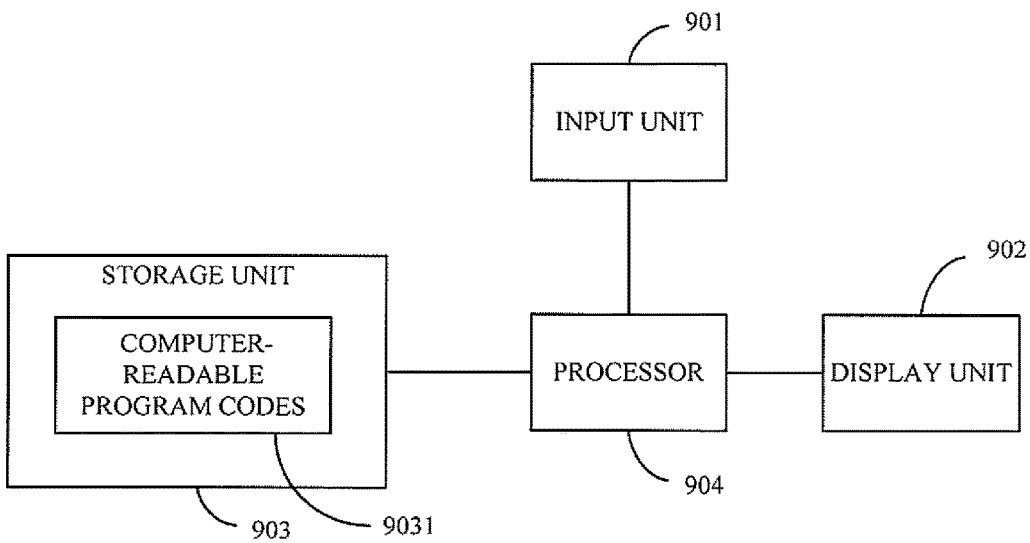
FIG. 9 shows a schematic structural diagram of an information receiving device according to an implementation of the present disclosure.

FIG. 9 shows a schematic structural diagram of an information receiving device according to an implementation of the present disclosure.

As shown in FIG. 9, an information receiving device according to an implementation of the present disclosure, can include but not limited to an input unit 901, a display unit 902, a storage unit 903, and a processor 904. The input unit 901, the display unit 902, and the storage unit 903 are electrically connected to the processor 904.

The input unit 901 is configured to input information to the terminal, such as letters. The input unit 901 may be but not limited to a physical keyboard, a touchscreen, or a combination of the physical keyboard and the touchscreen.

The display unit 902 is configured to display visual information, such as text, image. The display unit 902 may be an LED display screen.

The storage unit 903 is configured to store a plurality of computer-readable program codes 9031. The storage unit 903 can be a read only memory (ROM), a random access memory (RAM), a U-disk, a removable hard disk, etc.

The processor 904 can include multiple cores for multi-thread or parallel processing.

In this implementation, the processor 904 is configured to execute the plurality of computer-readable program codes 9031 to receive a short message transmitted by an information transmitting device; determine whether a disappear-after-reading tag is contained in the short message; and if the disappear-after-reading tag is contained in the short message, delete the content of the short message on the basis of a close command received, after the short message is opened.

In this implementation, the processor 904 is further configured to execute the plurality of computer-readable program codes 9031 to display the received short message containing the disappear-after-reading tag, wherein when the short message is not opened, it is displayed in a first display style; when the short message is opened, it is displayed in a second display style.

In this implementation, the processor 904 is configured to execute the plurality of computer-readable program codes 9031 to execute the plurality of computer-readable program codes to set the first display style and/or the second display style on the basis of a setting command received.

The implementation of the present disclosure is described in detail in conjunction with the accompanying drawings. By means of the implementation of the present disclosure, when bulk messaging, different short message transmission modes can be selected on the basis of whether or not disappear-after-reading is supported by recipients, thus increasing the flexibility of bulk messaging.

According to an implementation of the present disclosure, a program product stored in a non-volatile machine-readable medium for information transmission of a terminal is provided. The program product comprises machine-executable codes for a computer system to execute the following steps: a selection unit for selecting multiple pieces of target recipient information and a target transmission mode for a to-be-transmitted short message on the basis of a selection command received, wherein the target transmission modes include a disappear-after-reading transmission mode and a direct transmission mode; a first determination unit for determining whether the target transmission mode for the to-be-transmitted short message is the disappear-after-reading transmission mode; a second determination unit for determining respectively, when the target transmission mode is the disappear-after-reading transmission mode, whether disappear-after-reading is currently supported by an information receiving device corresponding to each piece of target recipient information among the multiple pieces of target recipient information; and a processing unit for transmitting the to-be-transmitted short message in the disappear-after-reading transmission mode to the information receiving device when disappear-after-reading is currently supported by the information receiving device, and transmitting the to-be-transmitted short message in the direct transmission mode to the information receiving device when disappear-after-reading is not currently supported by the information receiving device.

According to an implementation of the present disclosure, a non-volatile machine-readable medium, for storing a program product for information transmission of a terminal, is further provided. The program product comprises machine-executable codes for a computer system to execute the following steps: a selection unit for selecting multiple pieces of target recipient information and a target transmission mode for a to-be-transmitted short message on the basis of a selection command received, wherein the target transmission modes include a disappear-after-reading transmission mode and a direct transmission mode; a first determination unit for determining whether the target transmission mode for the to-be-transmitted short message is the disappear-after-reading transmission mode; a second determination unit for determining respectively, when the target transmission mode is the disappear-after-reading transmission mode, whether disappear-after-reading is currently supported by an information receiving device corresponding to each piece of target recipient information among the multiple pieces of target recipient information; and a processing unit for transmitting the to-be-transmitted short message in the disappear-after-reading transmission mode to the information receiving device when disappear-after-reading is currently supported by the information receiving device, and transmitting the to-be-transmitted short message in the direct transmission mode to the information receiving device when disappear-after-reading is not currently supported by the information receiving device.

According to an implementation of the present disclosure, a machine-readable program, for a machine to execute the information transmitting method according to any one of the above implementations, is provided.

According to an implementation of the present disclosure, a storage medium, for storing a machine-readable program for a machine to execute the information transmitting method according to any one of the above implementations, is provided.

According to an implementation of the present disclosure, a program product stored in a non-volatile machine-readable medium for information reception of a terminal is provided. The program product comprises machine-executable codes for a computer system to execute the following steps: a reception unit for receiving a short message transmitted by an information transmitting device; a determination unit for determining whether a disappear-after-reading tag is contained in the short message; a processing unit for, if the disappear-after-reading tag is contained in the short message, deleting the content of the short message on the basis of a close command received, after the short message is opened.

According to an implementation of the present disclosure, a non-volatile machine-readable medium, for storing a program product for information reception of a terminal, is provided. The program product comprises machine-executable codes for a computer system to execute the following steps: a reception unit for receiving a short message transmitted by an information transmitting device; a determination unit for determining whether a disappear-after-reading tag is contained in the short message; a processing unit for, if the disappear-after-reading tag is contained in the short message, deleting the content of the short message on the basis of a close command received, after the short message is opened.

According to an implementation of the present disclosure, a machine-readable program for a machine to execute the information receiving method according to any one of the above implementations is provided.

According to an implementation of the present disclosure, a storage medium, for storing a machine-readable program for a machine to execute the information receiving method according to any one of the above implementations, is provided.

The foregoing is merely example implementations of the present disclosure, and is not intended to limit the present disclosure. For persons skilled in the art, the present disclosure could have various modifications and variations. Any amendments, equivalents, or improvements etc. within the spirit and principle of the present disclosure should be included within the protection scope of the present disclosure.

What is claimed is:

1. An apparatus for transmitting information, comprising:
   a storage unit storing a plurality of computer-readable program codes; and
   a processor electrically connected to the storage unit and configured to execute the plurality of computer-readable program codes to:
      select multiple pieces of target recipient information and a target transmission mode for a to-be-transmitted short message based on a selection command received, wherein the target transmission mode includes a disappear-after-reading transmission mode and a direct transmission mode;
      determine whether the target transmission mode for the to-be-transmitted short message is the disappear-after-reading transmission mode;
      determine respectively, when the target transmission mode is the disappear-after-reading transmission mode, whether disappear-after-reading is currently supported by an information receiving device corresponding to each piece of target recipient information among the multiple pieces of target recipient information; and
      transmit the to-be-transmitted short message in the disappear-after-reading transmission mode to the information receiving device when disappear-after-reading is currently supported by the information receiving device, and transmitting the to-be-transmitted short message in the direct transmission mode to the information receiving device when disappear-after-reading is not currently supported by the information receiving device.

2. The apparatus of claim 1, wherein the disappear-after-reading transmission mode comprises: adding a disappear-after-reading tag to the to-be-transmitted short message, and transmitting the to-be-transmitted short message with the disappear-after-reading tag.

3. The apparatus of claim 1, wherein the direct transmission mode comprises: directly transmitting the to-be-transmitted short message.

4. The apparatus of claim 1, wherein the plurality of computer-readable program codes to determine respectively, when the target transmission mode is the disappear-after-reading transmission mode, whether disappear-after-reading is currently supported by an information receiving device corresponding to each piece of target recipient information among the multiple pieces of target recipient information comprise computer-readable codes to:
   determine whether the information receiving device is currently online or has been registered; and
   when the information receiving device is online or has been registered, determine that disappear-after-reading is currently supported by the information receiving device.

5. The apparatus of claim 4, wherein the processor is further configured to execute the plurality of computer-readable program codes to:
   when disappear-after-reading is supported by the information receiving device, add a tag of supporting disappear-after-reading to the target recipient information corresponding to the information receiving device.

6. The apparatus of claim 5, wherein the processor is further configured to execute the plurality of computer-readable program codes to:
determine respectively whether the disappear-after-reading tag is contained in each piece of target recipient information, and when the disappear-after-reading tag is contained in the target recipient information, determine that disappear-after-reading is currently supported by the information receiving device.

7. The apparatus of claim 5, wherein the processor is further configured to execute the plurality of computer-readable program codes to:
determine respectively whether the disappear-after-reading tag is contained in each piece of target recipient information, and when the disappear-after-reading tag is not contained in the target recipient information, determine that disappear-after-reading is not currently supported by the information receiving device.

8. The apparatus of claim 4, wherein the processor is further configured to execute the plurality of computer-readable program codes to:
when disappear-after-reading is not supported by the information receiving device, add a tag of not supporting disappear-after-reading to the target recipient information corresponding to the information receiving device.

9. The apparatus of claim 1, wherein the plurality of computer-readable program codes to determine respectively, when the target transmission mode is the disappear-after-reading transmission mode, whether disappear-after-reading is currently supported by an information receiving device corresponding to each piece of target recipient information among the multiple pieces of target recipient information comprise computer-readable codes to:
determine whether the information receiving device is currently online or has been registered; and
when the information receiving device is not online or not registered, determine that disappear-after-reading is not currently supported by the information receiving device.

10. An apparatus for receiving information, comprising:
a storage unit storing a plurality of computer-readable program codes; and
a processor electrically connected to the storage unit and configured to execute the plurality of computer-readable program codes to:
receive a short message transmitted by an information transmitting device;
determine whether a disappear-after-reading tag is contained in the short message;
when the disappear-after-reading tag is contained in the short message, determine whether the short message is opened;
when the disappear-after-reading tag is contained in the short message and when the message is not opened, display the short message in a first display style;
when the disappear-after-reading tag is contained in the short message, delete content of the short message based on a close command received, after the short message is opened;
based on the close command received, display a video indicating the content of the short message is being deleted; and
based on the close command received and after the content of the short message is deleted, display the short message in a second display style when the disappear-after-reading tag is contained in the short message,
wherein at least one of the first display style and the second display style is selected from two or more display styles based on a setting command received.

11. A method for transmitting information, comprising:
selecting multiple pieces of target recipient information and a target transmission mode for a to-be-transmitted short message based on a selection command received, wherein the target transmission mode includes a disappear-after-reading transmission mode and a direct transmission mode;
determining whether the target transmission mode for the to-be-transmitted short message is the disappear-after-reading transmission mode;
determining respectively, when the target transmission mode is the disappear-after-reading transmission mode, whether disappear-after-reading is currently supported by an information receiving device corresponding to each piece of target recipient information among the multiple pieces of target recipient information; and
transmitting the to-be-transmitted short message in the disappear-after-reading transmission mode to the information receiving device when disappear-after-reading is currently supported by the information receiving device, and transmitting the to-be-transmitted short message in the direct transmission mode to the information receiving device when disappear-after-reading is not currently supported by the information receiving device.

12. The method of claim 11, wherein the disappear-after-reading transmission mode comprises: adding a disappear-after-reading tag to the to-be-transmitted short message, and transmitting the to-be-transmitted short message with the disappear-after-reading tag.

13. The method of claim 11, wherein the direct transmission mode comprises: directly transmitting the to-be-transmitted short message.

14. The method of claim 11, wherein determining respectively, when the target transmission mode is the disappear-after-reading transmission mode, whether disappear-after-reading is currently supported by an information receiving device corresponding to each piece of target recipient information among the multiple pieces of target recipient information, comprises:
determining whether the information receiving device is currently online or has been registered; and
when the information receiving device is online or has been registered, determining that disappear-after-reading is currently supported by the information receiving device.

15. The method of claim 14, further comprising:
when disappear-after-reading is supported by the information receiving device, adding a tag of supporting disappear-after-reading to the target recipient information corresponding to the information receiving device.

16. The method of claim 15, further comprising:
determining respectively whether the disappear-after-reading tag is contained in each piece of target recipient information, and when the disappear-after-reading tag is contained in the target recipient information, determining that disappear-after-reading is currently supported by the information receiving device, and when the disappear-after-reading tag is not contained in the target recipient information, determining that disappear-after-reading is not currently supported by the information receiving device.

17. The method of claim 14, further comprising:
when disappear-after-reading is not supported by the information receiving device, adding a tag of not supporting disappear-after-reading to the target recipient information corresponding to the information receiving device.

18. The method of claim 11, wherein determining respectively, when the target transmission mode is the disappear-after-reading transmission mode, whether disappear-after-reading is currently supported by an information receiving device corresponding to each piece of target recipient information among the multiple pieces of target recipient information comprises:
determining whether the information receiving device is currently online or has been registered; and
when the information receiving device is not online or not registered, determining that disappear-after-reading is not currently supported by the information receiving device.

* * * * *